June 10, 1947.  M. R. GALLIMORE  2,421,875
CLUTCH AND SPROCKET ASSEMBLY
Filed Aug. 4, 1944   2 Sheets-Sheet 2
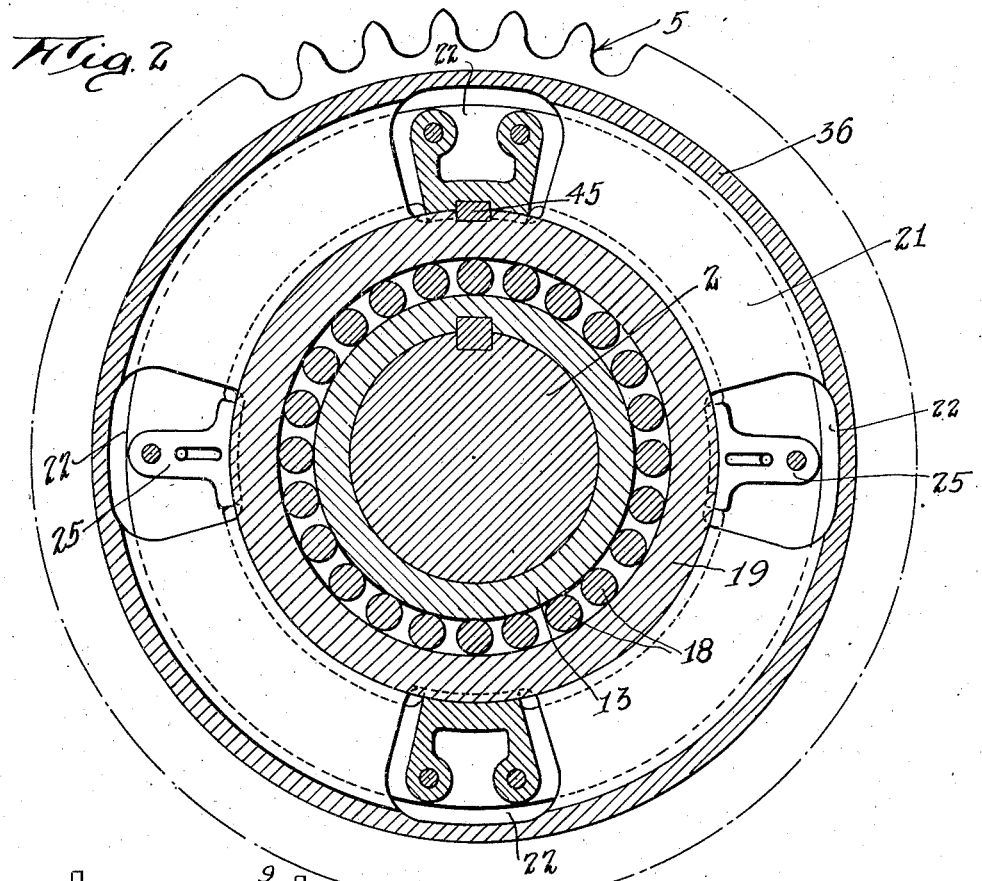
Fig. 2
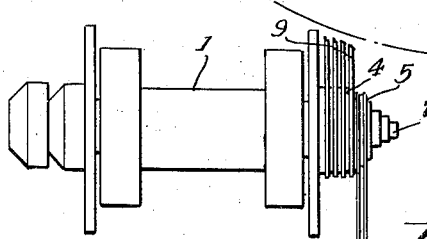
Fig. 3
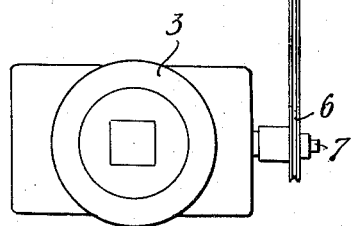
Inventor
Marshall R. Gallimore
By Lyon & Lyon
Attorneys Patented June 10, 1947

2,421,875

UNITED STATES PATENT OFFICE 2,421,875

CLUTCH AND SPROCKET ASSEMBLY

Marshall R. Gallimore, Los Angeles, Calif., assignor to The National Supply Company, Pittsburgh, Pa., a corporation of Pennsylvania Application August 4, 1944, Serial No. 548,019

7 Claims. (Cl. 192—48)

1

This invention relates to sprocket mountings and more particularly to a composite sprocket providing a transmission connection for the driving of two separate elements and incorporating a clutch means therein for releasably connecting the clutch elements together and to the supporting shaft thereof.

This invention is particularly adapted for utilization in a rotary drawworks to provide transmission connections between the line shaft of such a drawworks, the drum shaft thereof, and the rotary machine of a consolidated drilling rig. While this invention is particularly adapted for such use, it is not limited in its application to such positioning or use. One of the principal advantages of the invention of this application resides in the overall saving of length accomplished through the combining of the elements of the compound sprocket so that the clutch means is housed in the hub structures of the sprockets.

It is an object of this invention to provide a sprocket mounting which includes a driven sprocket, a second sprocket adapted to be driven therefrom, both of which sprockets are supported upon a shaft, and wherein there is provided a clutch means positioned axially within the structure of such sprockets providing for clutching of the driven sprocket with the drive sprocket or for clutching of the driven sprocket with the supporting shaft.

It is another object of this invention to provide a dual sprocket assembly wherein the sprockets are mounted in close coupled relation and which dual sprocket assembly is adapted for use in a drawworks construction permitting the utilization of a large size drawworks drum without material misalignment of the center of the drum and the bore of the rotary machine driven from such dual sprocket.

Another object of this invention is to provide a dual sprocket mounting in which there is provided a clutch assembly positioned within the interior of the sprockets and which provides for the driving of one sprocket from the other or for the driving of the supporting shaft from one of such sprockets and wherein there is utilized a clutch element adapted to be selectively engaged to permit of such drives and wherein utilization of the quill shaft and its supporting bearings is eliminated.

Other objects and advantages of this invention it is believed will be apparent from the following detailed description of a preferred embodiment thereof as illustrated in the accompanying drawing.

In the drawings:

Figure 1 is an elevation principally in vertical mid-section of a sprocket mounting embodying my invention.

2

Figure 2 is a sectional view taken substantially on the line 2—2 of Figure 1.

Figure 3 is a diagrammatic view illustrating an adaptation of the sprocket mounting embodying my invention.

Figure 1:
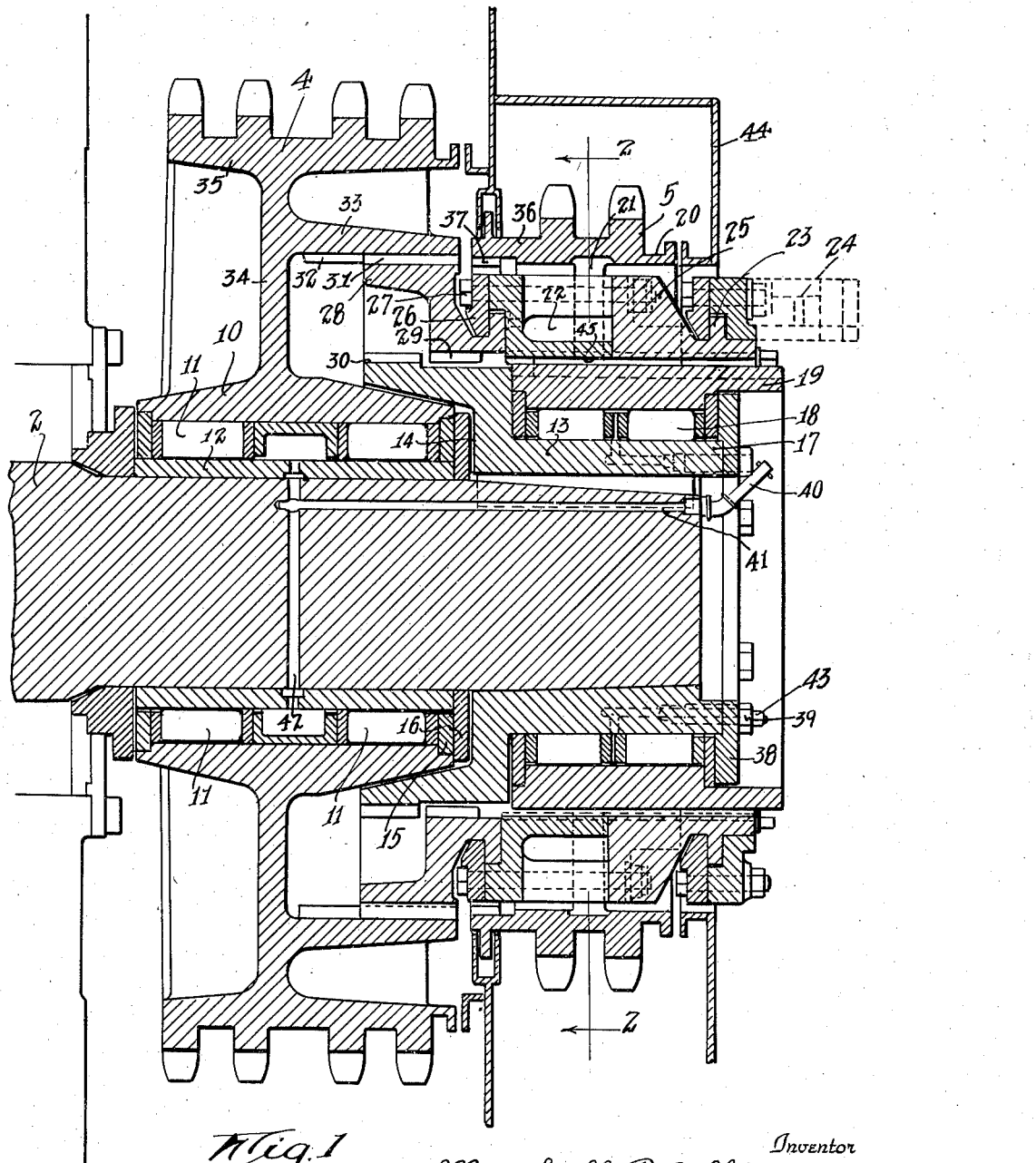

In the drawings, in Figure 3 thereof, I have illustrated a particular adaptation of the sprocket mounting embodying my invention. In this drawing 1 indicates the hoisting drum of a rotary drilling rig drawworks which is secured upon a shaft 2 to be driven therewith. 3 indicates a rotary machine used in the rotary process of drilling wells and which is commonly driven from a transmission connection supported upon the shaft 2.

The sprocket embodying my invention includes a driven sprocket 4 which is driven from any suitable source, commonly the line shaft of a drilling rig drawworks and which sprocket 4 is employed as the driving means for the shaft 2 and for the rotary machine drive sprocket 5 mounted adjacent the sprocket 4 on the shaft 2 and in position of alignment with the sprocket 6 carried by the drive shaft 7 of the rotary machine 3. A chain 8 connects the sprocket 5 with the sprocket 6, while a multiple chain 9 is commonly employed for driving the sprocket 4. The sprocket 4 has its hub 10 journaled upon bearings 11 mounted around a sleeve 12 positioned upon the shaft 2. A clutch ring 13 is keyed to the projecting end of the shaft 2. Positioned between the end face 14 of the ring 13 and the end retaining ring 15 for the bearings 11 is a retention ring 16.

Journaled on the cylindrical section 17 of the ring 13 upon bearings 18 is the hub 19 of the sprocket 5. The hub 19 is connected with the sprocket ring 20 by means of a web 21 which is provided with a plurality of openings 22. Slidably mounted upon the surface of the hub 19 is a shifter ring 23 which is suitably connected with any suitable form of shifter fork 24. The shifter ring 23 is provided with a plurality of arms 25 which extend through the openings 22 and are secured at their forward ends to a split ring 26 by bolts 27. The unitary assembly comprising the shifter ring 23 and arms 25 is slidably keyed to the hub 19 by means of the key 45. The movable clutch ring 28 is thus housed completely within the interior of the sprockets 4 and 5 and encircles the clutch ring 13.

The movable clutch ring 28 is provided on its inner surface with clutch teeth 29 which are adapted to be engaged with the clutch teeth 30 of the clutch ring 13 when the movable clutch ring 28 is moved to the left from its position as viewed in Figure 1. The clutch ring 28 has outer teeth 31 formed on its outer periphery which engage with clutch teeth 32 formed on the inner periphery of the clutch ring 33 which is formed integral with the web 34 which connects the sprocket hub 10 with the sprocket ring 35 of the sprocket 4. These teeth 32 extend substantially the length of the ring 33 and are formed upon the inner surface of the ring 33.

The outer ring 36 of the sprocket 5 has an integral inwardly projecting clutch ring which extends over the clutch ring 13 and has clutch teeth 37 formed on its inner periphery in position of alignment with the clutch teeth 32 of the ring 33.

As will be apparent from Figure 1, the movable clutch ring 28 may be shifted to the positions where there is a driving connection established between the teeth 29 and 30 for driving the drum shaft 2 through the clutch ring 13 or may be shifted to position where the teeth 31 engage both the teeth 32 and 37 so that the sprocket 5 is driven from the sprocket 4 or may be shifted to the position as indicated in Figure 1 which is a neutral position, so that there is no drive established from the sprocket 4.

The sprocket 5 it will be noted is journaled upon a cylindrical portion 17 of the clutch ring 13 which is of reduced diameter as compared with the portion carrying the teeth 30. A retaining ring 38 is secured by means of cap screws 39 to the end of the clutch ring 13 and acts to retain the sprocket 5 and the bearings 18 in their position upon the section 17. The bearings 11 are lubricated through the medium of a grease fitting 40 which provides a means for admitting grease through the ports 41, 42 formed in the shaft 2 to the bearings 11, while a second grease fitting 43 is mounted in the clutch ring 13 and extends through the retaining plate 38 for admitting grease to the bearings 18. A suitable sprocket guard 44 is provided which is supported by the frame of the drawworks.

Having fully described my invention, it is to be understood that I do not wish to be limited to the details herein set forth, but my invention is of the full scope of the appended claims.

I claim:

1. In a sprocket mounting, the combination of a shaft, a sprocket journaled on the shaft, a clutch ring secured to the shaft and having clutch teeth extending to a position within the sprocket, a second sprocket journaled on the clutch ring, the first sprocket having internal clutch teeth, the second sprocket having internal clutch teeth in alignment with the clutch teeth of the first sprocket, the clutch ring having external clutch teeth, a movable clutch collar housed within the structure of the first and second sprockets and surrounding the clutch ring and having internal and external clutch teeth, the external clutch teeth being in engagement with the internal clutch teeth of the first sprocket, and means for shifting the movable clutch collar to selectively engage its external clutch teeth with the internal clutch teeth of the second sprocket, or to its internal clutch teeth with the external clutch teeth of the first stated clutch ring.

2. In a sprocket mounting, the combination of a shaft, a sprocket journaled on the shaft, the sprocket having a hub portion by which it is journaled on the shaft, a radially spaced cylindrical sprocket section and a web connecting the hub and radially spaced sprocket section providing a chamber between the hub and radially spaced sprocket section, a clutch ring fixed to the shaft and having a clutch section extended to a position within the said chamber, a second sprocket journaled on the said clutch ring, a movable clutch collar adapted to be moved to within the chamber of the first sprocket, the movable clutch collar surrounding the first said clutch ring, the first and second sprockets having internal teeth, and the fixed clutch ring having external clutch teeth, the movable clutch collar having internal clutch teeth adapted to be selectively engaged with the external clutch teeth of the fixed clutch ring, and external clutch teeth adapted to be slidably engaged with the internal clutch teeth of one of said sprockets and selectively engaged with the internal clutch teeth of the other sprocket.

3. In a sprocket mounting, the combination of a shaft, a first sprocket journaled on the shaft, a fixed clutch collar secured to the shaft, a second sprocket journaled on the clutch collar, said second sprocket including a hub section, a sprocket section and a web connecting the said sections, a movable clutch collar surrounding the fixed clutch collar, a shifter mechanism extending through the web of the second sprocket to engage the movable clutch collar, means for actuating the said clutch shifter element and secured thereto exterior to the second sprocket, the first and second sprocket having clutch teeth in axial alignment, the fixed clutch collar having external clutch teeth and the movable clutch collar having external and internal clutch teeth whereby the driving connection may be selectively established between the first sprocket and the shaft or between the first and second sprockets depending upon the position to which the movable clutch collar is moved.

4. In a sprocket mounting, the combination of a shaft, a first sprocket journaled on the shaft and having a rim and a hub, a clutch ring secured to the shaft adjacent the said sprocket and having a clutch element extending within the space enclosed by the rim and the hub of the sprocket, a second sprocket journaled on the clutch ring, said second sprocket including a sprocket rim, a hub, and a web connecting the rim and the hub, a movable clutch collar housed within the sprocket rims of the said sprockets and clutched to one of said sprockets and adapted to be selectively moved to clutch with the other said sprocket or the said clutch ring, and a movable clutch collar shifting element extending through the web of the said second sprocket.

5. In a device of the class described, a drum shaft, a drum secured to the shaft, a sprocket assembly mounted upon the drum shaft, said sprocket assembly including a driving sprocket and a driven sprocket mounted in close coupled relation, and a selective clutch means mounted within the said sprocket assembly and including a clutch ring secured to the shaft, a movable clutch element having internal and external clutch jaws, the said sprockets having internal clutch jaws and the clutch ring having an external clutch jaw, and means extending within the sprocket assembly for shifting the clutch collar in position of selective engagement between the driven sprocket and the clutch ring or the driven sprocket and the driving sprocket.

6. In a device of the class described, a shaft, a clutch ring releasably secured to the shaft, a first sprocket rotatably mounted on the shaft adjacent the clutch ring, a second sprocket encircling the shaft and rotatably mounted on a portion of the clutch ring, an axially shiftable collar operatively positioned between said sprockets, interengaging spline means adapted to connect said collar for rotation with the first sprocket, releasable clutch means between said collar and the second sprocket and between said collar and the clutch ring, and a shifter element adapted to shift said collar to selectively engage either of said releasable clutch means.

7. In a device of the class described, a shaft, a clutch ring secured to the shaft adjacent one end thereof, a first sprocket rotatably mounted on the shaft adjacent the clutch ring, a second sprocket rotatably mounted on a portion of the clutch ring, an axially shiftable collar operatively positioned between said sprockets and encircling a portion of the clutch ring, interengaging spline means adapted to connect said collar for rotation with the first sprocket, releasable clutch means between said collar and the second sprocket and between said collar and the clutch ring, and a shifter element extending axially through one of said sprockets adapted to shift said collar to selectively engage either of said releasable clutch means.

MARSHALL R. GALLIMORE.

REFERENCES CITED

The following references are of record in the file of this patent:

UNITED STATES PATENTS

| Number | Name | Date |
| --- | --- | --- |
| 2,351,851 | Young | June 20, 1944 |
| 2,350,411 | Nabstedt | June 6, 1944 |
| 2,041,445 | Warren | May 19, 1936 |
| 2,106,087 | Davey | Jan. 18, 1938 |
| 2,106,086 | Davey | Jan. 18, 1938 |
| 1,858,700 | Besonson | May 17, 1932 |
| 1,633,847 | Crawford | June 28, 1927 |